No. 622,071. Patented Mar. 28, 1899.
H. C. POLLMAN.
SPRINKLER HEAD.
(Application filed Dec. 5, 1898.)
(No Model.)

Attest: W. R. Smith, A. J. McCauley.
Inventor: H. C. Pollman, By Higdon & Longan, Atty's.

UNITED STATES PATENT OFFICE.

HENRY C. POLLMAN, OF ST. LOUIS, MISSOURI.

SPRINKLER-HEAD.

SPECIFICATION forming part of Letters Patent No. 622,071, dated March 28, 1899.

Application filed December 5, 1898. Serial No. 698,287. (No model.)

*To all whom it may concern:*

Be it known that I, HENRY C. POLLMAN, of the city of St. Louis, State of Missouri, have invented certain new and useful Improvements in Sprinkler-Heads, of which the following is a full, clear, and exact description, reference being had to the accompanying drawings, forming a part thereof.

My invention relates to sprinkler-heads; and it consists of the novel construction, combination, and arrangement of parts hereinafter described and claimed.

Figure 1:
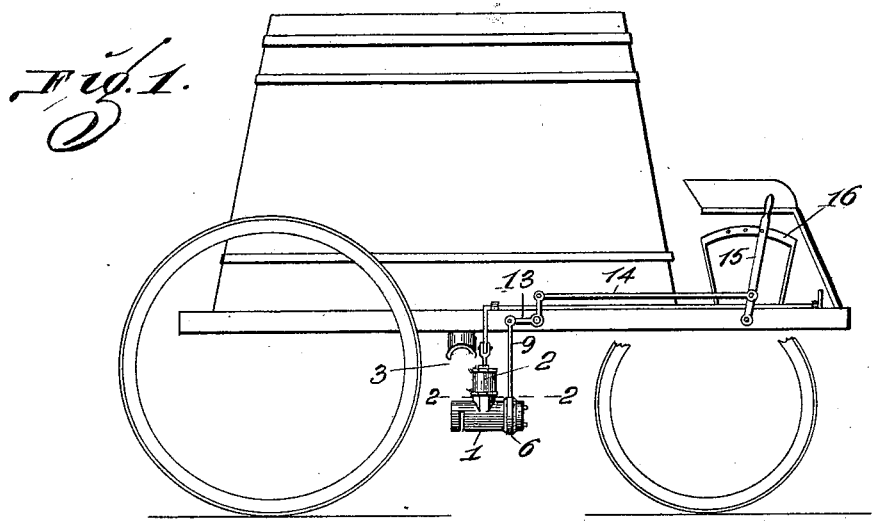
Figure 2:
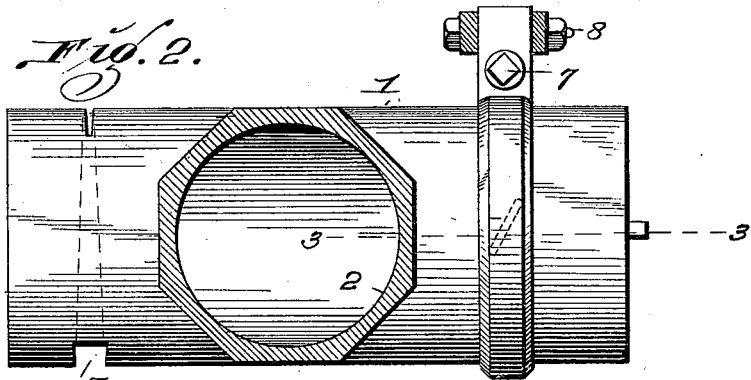
Figure 3:
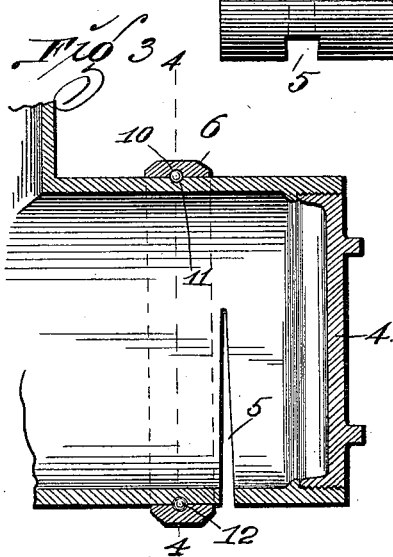
Figure 4:
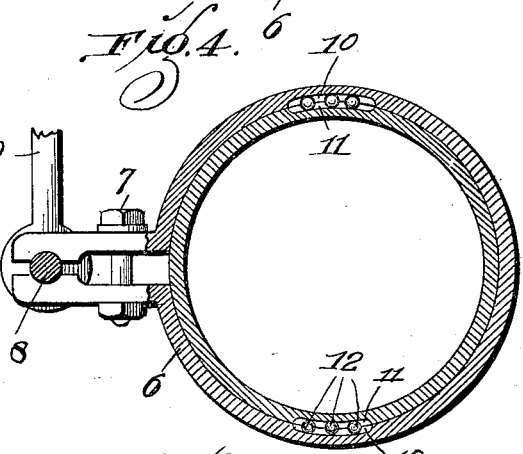

Figure 1 is a side elevation of a sprinkling-wagon equipped with one of my improved sprinkling-heads. Fig. 2 is an enlarged horizontal sectional view taken approximately on the line 2 2 of Fig. 1. Fig. 3 is an enlarged vertical sectional view taken approximately on the line 3 3 of Fig. 2. Fig. 4 is a transverse sectional view taken approximately on the line 4 4 of Fig. 3.

In the construction of my improved sprinkler-head a horizontally-arranged cylindrical casing 1 is formed integral with the lower end of the vertically-arranged tube 2, to which tube 2 leads the supply-pipe 3 from the interior of the tank of the sprinkling-cart. A cap 4 is screw-seated in one end of the cylinder 1 to normally close the same, and formed in the under side of said cylinder are the transversely-arranged tapered slots 5. Arranged to operate upon one end of the cylinder 1, adjacent one of the tapered slots therein, is a ring 6, the ends thereof being clamped together by a bolt 7, and said ends are extended beyond this bolt 7 and engage upon a pin 8, which passes transversely through the bifurcated lower end of the vertically-arranged rod 9. Formed in the inner surface of the ring and on opposite sides thereof are the inclined grooves 10, the same coinciding with mating inclined grooves 11, formed in the surface of the cylinder 1. Located within this pair of coinciding grooves are balls 12, thus forming a ball-bearing between the cylinder 1 and ring 6. The upper end of the rod 9 is pivotally held to one arm of a pivoted bell-crank 13, the opposite arm of which bell-crank is pivotally connected to a horizontally-operating rod 14, which is connected to a hand-lever 15. This hand-lever is arranged adjacent the driver's seat upon the cart and operates against the segment 16. When the hand-lever 15 is manipulated so as to actuate the bell-crank 13 and move the rod 9 upwardly or downwardly, the ring 6 is necessarily rotated upon the cylinder 1, and when so rotated it will move laterally thereupon, owing to the inclination of the coinciding grooves 10 and 11 and the balls 12, bearing therein. As said ring moves upon the cylinder 1 it will open or close the slot in the end of the cylinder upon which said ring is rotated, and the volume of water passing outwardly through said slot may be graduated as desired.

When the hand-lever is actuated so as to throw the ring 6 to its forward limit of movement, said ring entirely closes the slot, and when said ring is moved to its rearward limit of movement said slot is entirely opened.

By providing the ball-bearings between the cylinder 1 and the ring said ring will move upon the cylinder with comparatively little friction, at the same time fitting upon said cylinder closely enough to prevent any leakage of water through the slot when said ring closes said slot.

Any wear or lost motion between the ring and cylinder may be taken up by tightening the bolt 7.

Heretofore in sprinkler-heads of my improved construction it has been impossible to mount a sliding ring upon the cylinder so that it will operate freely and at the same time prevent all leakage of water through the slot it covers when said ring is moved to a position over said slot, and my improved construction of locating the ball-bearings in the coinciding grooves overcomes this objection.

A sprinkler-head of my improved construction possesses superior advantages in point of simplicity, durability, and general efficiency and may be very easily shifted upon the cylinder to open or close the slot therein.

Although I have shown the sprinkler-head provided with slots in each end, I find it necessary to only provide one of said slots with the ring 6, the opposite slot remaining open at all times.

I claim—

1. In a sprinkler-head, a cylinder having closed ends and a tapered slot formed in the under side of one of the ends of said cylinder, a ring operating upon said cylinder over said slot, and ball-bearings interposed between the cylinder and ring, substantially as specified.

2. In a sprinkler-head, a cylinder having closed ends and a slot formed in the under side of one of the ends thereof, a ring arranged for movement upon the cylinder adjacent said slot, there being inclined coinciding grooves formed in the surface of the cylinder and the inner face of the ring, balls located in said coinciding grooves, and means whereby said ring is rotated, substantially as specified.

3. In a sprinkler-head, a cylinder having a slot formed in the under side thereof, an imperforate ring arranged upon the cylinder adjacent the slot, means whereby said ring is rotated, and ball-bearings interposed and so arranged between the cylinder and the ring as to cause the ring to move longitudinally when it is rotated, substantially as specified.

4. A sprinkler-head, comprising a cylinder having closed ends, in one end of which cylinder is formed a transverse slot, a ring rotatably arranged upon the end of the cylinder adjacent the slot, means whereby said ring is rotated, there being oppositely-arranged coinciding pairs of inclined grooves formed in the cylinder and ring, and balls located in said pairs of coinciding grooves, substantially as specified.

In testimony whereof I affix my signature in presence of two witnesses.

HENRY C. POLLMAN.

Witnesses:
JOHN C. HIGDON,
M. P. SMITH.